July 16, 1935.  B. H. MOSSINGHOFF  2,008,149

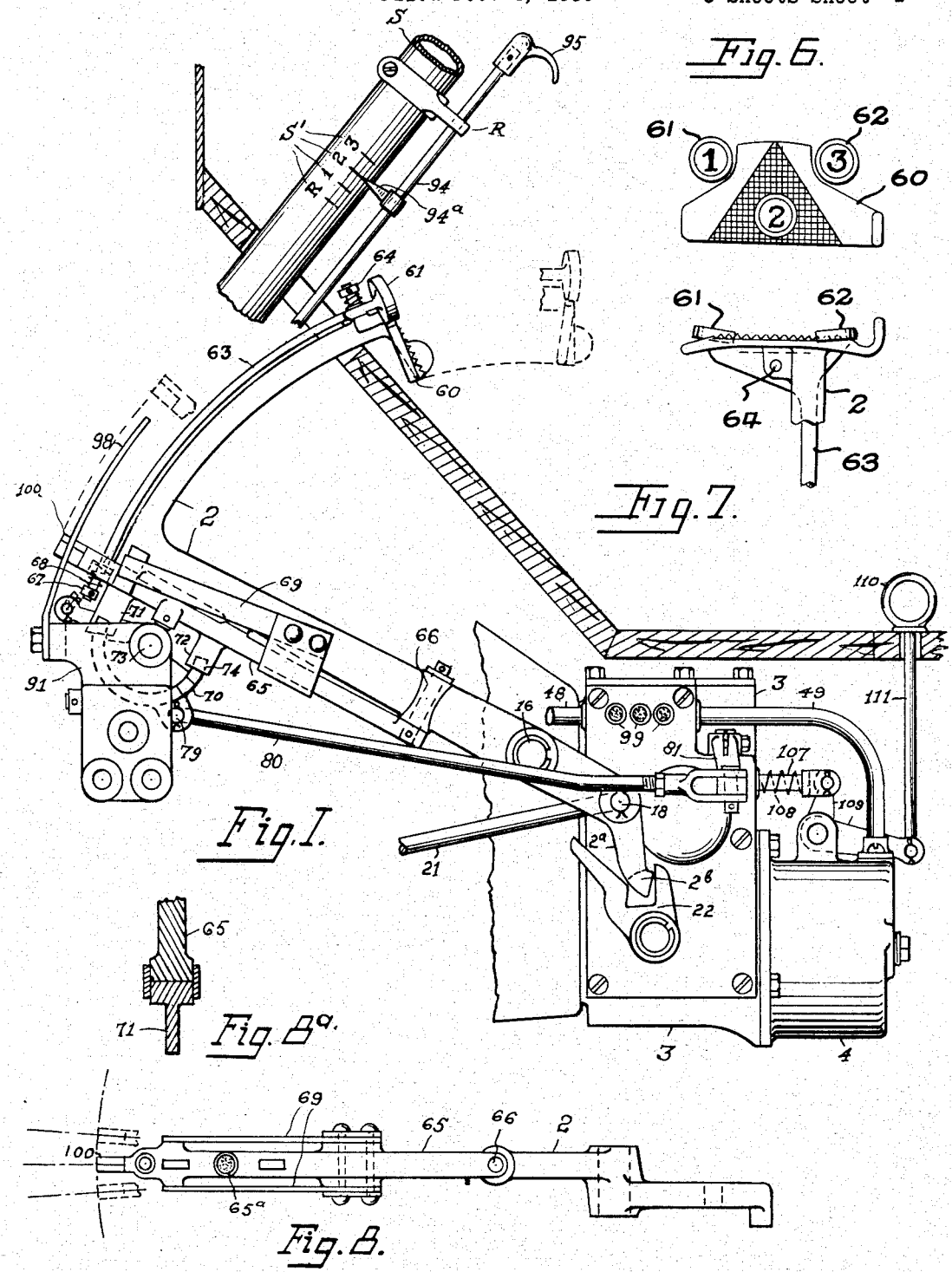

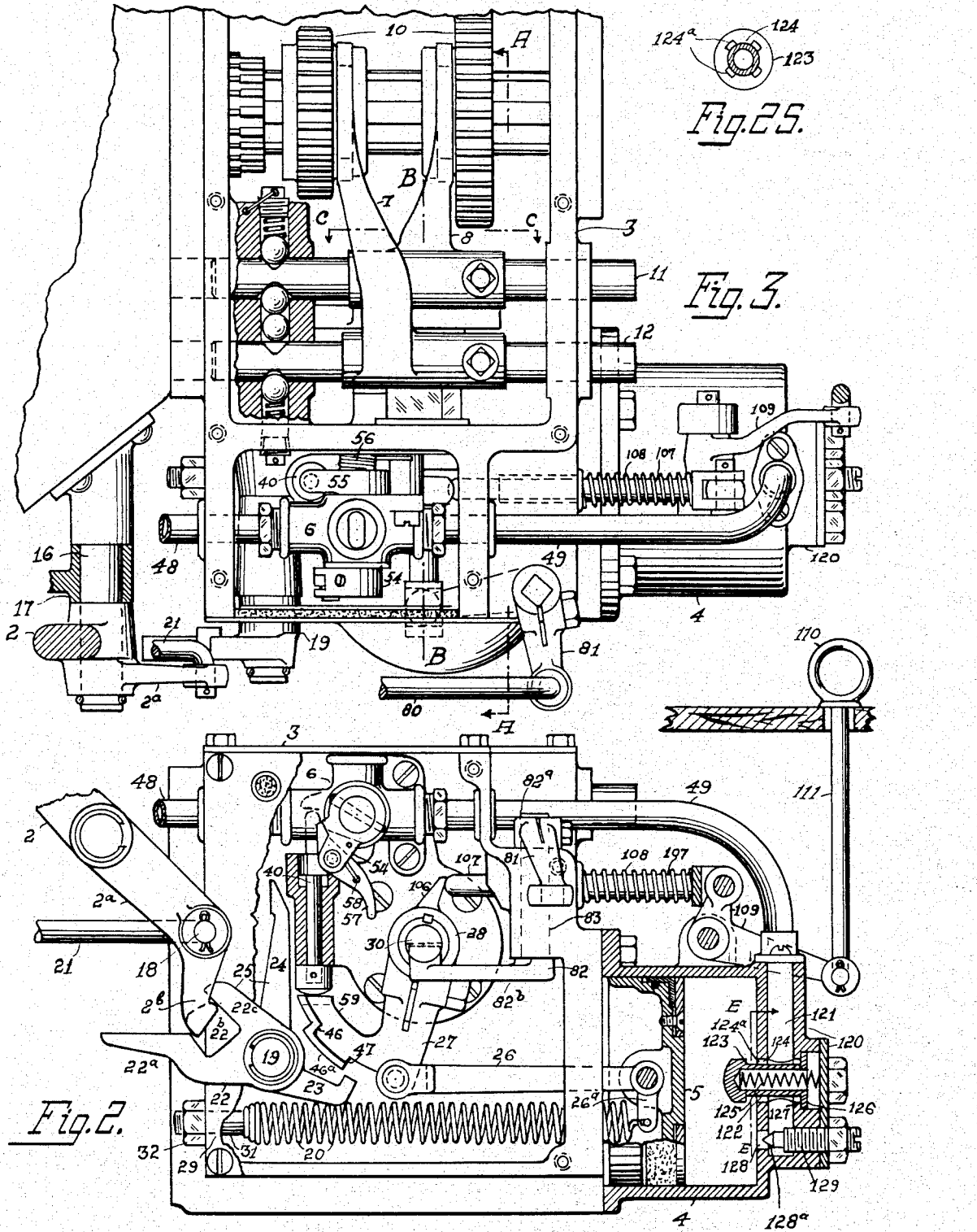

AUTOMOBILE SPEED CONTROL DEVICE

Filed Dec. 4, 1930  5 Sheets-Sheet 3

Inventor

July 16, 1935.  B. H. MOSSINGHOFF  2,008,149
AUTOMOBILE SPEED CONTROL DEVICE
Filed Dec. 4, 1930  5 Sheets-Sheet 4
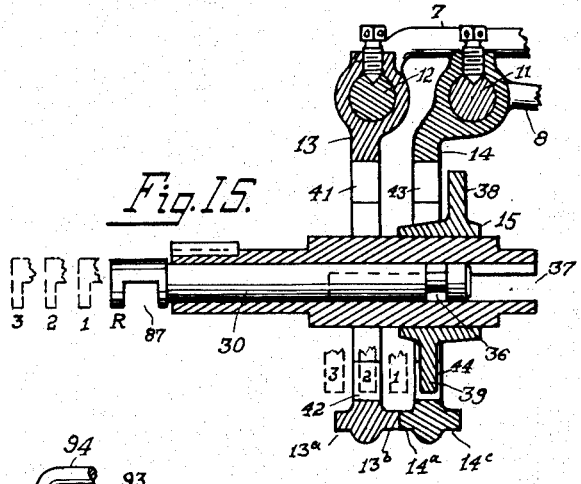
Fig.15.
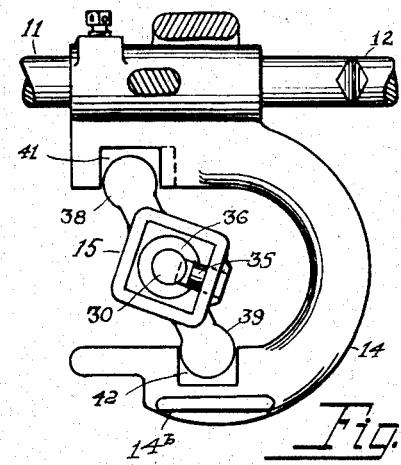
Fig.16.
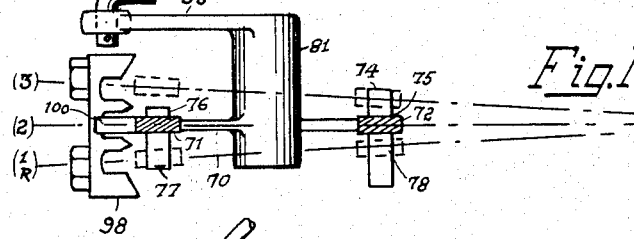
Fig.17.
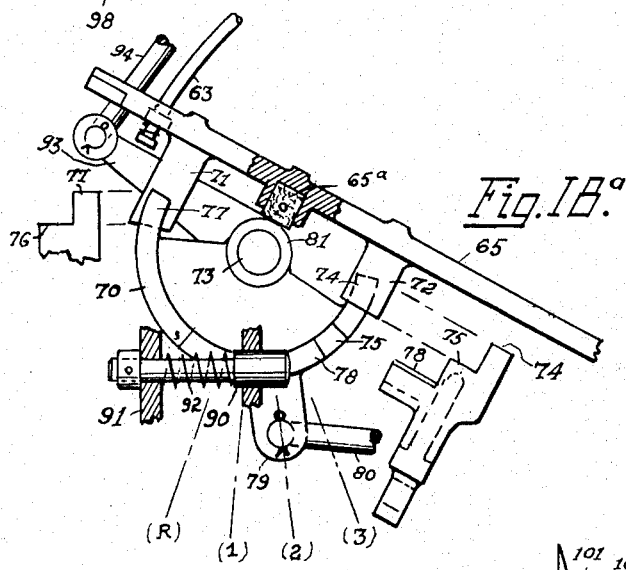
Fig.18.ᵃ
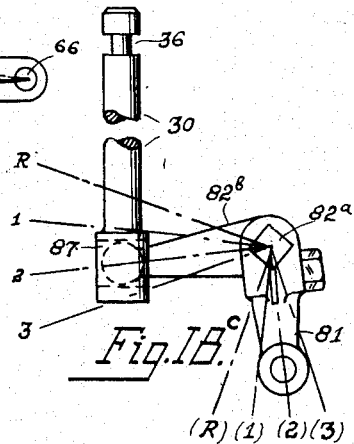
Fig.18.ᶜ
Fig.18.ᵇ
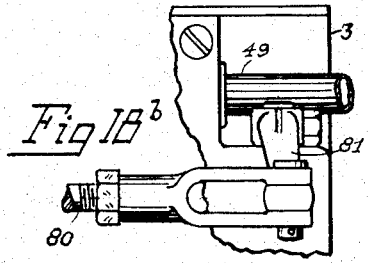
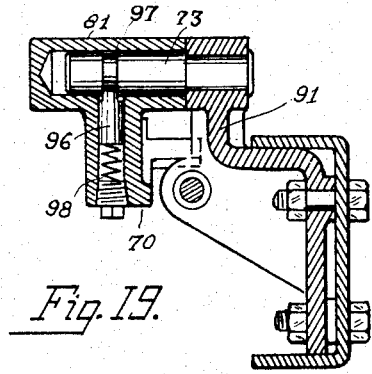
Fig.19.
Fig.20.
Inventor
Bernard H. Mossinghoff July 16, 1935. B. H. MOSSINGHOFF 2,008,149
AUTOMOBILE SPEED CONTROL DEVICE
Filed Dec. 4, 1930 5 Sheets-Sheet 5

Inventor
Bernard H. Mossinghoff

UNITED STATES PATENT OFFICE 2,008,149

AUTOMOBILE SPEED CONTROL DEVICE

Bernard H. Mossinghoff, Chicago, Ill., assignor to Progressive Motor Devices Corporation, Chicago, Ill., a corporation of Illinois Application December 4, 1930, Serial No. 500,026

91 Claims. (Cl. 74—334)

My invention relates to improvements in transmission control devices for self-propelled vehicles and more particularly to a power-actuated, foot controlled mechanism for operatively and selectively engaging and disengaging the transmission elements. Reference is made to my co-pending application, Serial Number 1,601, filed January 10, 1925, for speed change devices.

One of the main objects of my invention is to radically simplify the operation of the automobile from the standpoint of the driver by providing improved means for reducing the conventional speed changing operation to a single, readily performable by the driver movement.

Another object of my invention is to provide an improved power operable pedally controllable speed change device for automobiles capable of effecting any, out of a plurality of available speed changes, in response to a selective placement of the driver's foot upon the control pedal and a single uniform depression of the same.

Another object of my invention is to provide an improved, power actuated speed ratio change device for automobiles operable in conjunction with and through the instrumentality of the clutch pedal in a manner to require only the conventional clutch operational movement on the side of the driver for all forward speeds, thus leaving the latter's hands free for steering purposes and clearing the floor board of cumbersome levers; while at the same time providing special hand operable means for reverse speed for the purpose of reducing the danger of inadvertently meshing the gears for reverse.

Another object of my invention is to provide a power operable primarily pedally controllable speed ratio change device for automobiles in which the power is applied to effect a ratio change at the return stroke of the control pedal.

Another object of my invention is to provide means in a pedally controllable power actuated speed change device for transiently applying the power to effect a speed change at the very beginning of the return stroke of the control pedal, and for confining the application of the power solely to the actuation of the speed change effecting members of said device.

Another object is to provide means in a power-actuated pedally controlled gear shift mechanism for neutralizing the gears on the forward stroke of the pedal, and for effectively applying the power to shift the gears into engagement on the rearward stroke of the pedal, thereby introducing a synchronizing pause between the two operations.

Another object is to provide improved unidirectionally energizable power means for performing the speed ratio changes in an automobile, and for utilizing the engine generated vacuum for the purpose.

Another object is to provide means in an automobile gear shifting device which both coordinate the clutch operation with the gear shift operations, and prevent the former operation until the gears are either fully meshed or fully neutralized.

A further object is to provide emergency operative means in connection with a power actuated speed change device, through which the driver can change the speed as desired by muscular power, should the power means fail.

A further object is to provide an improved selective pedal in connection with a power operable automobile speed ratio change mechanism, comprising lightly yieldable foot contact surfaces, each speed selection being effected according to the preponderance of pressure of the operator's foot upon either of said surfaces.

A further object is to provide in a power actuated speed ratio change mechanism a single member as the recipient of both the selective and the actuating operations, and whose function it is to selectively shift the speed change effecting members.

A still further object is to provide improved neutralizing means in a pedally controlled power actuated gear shift mechanism mounted to oppose the positive movement of the power means, thereby storing energy during said movement for the neutralizing operation, said neutralizing operation being performed upon partial depression of the control pedal.

A still further object of my invention is to provide a device as hereinafter described which would accomplish the objects hereinbefore set forth in the most efficient manner; a device compact and simple of construction, convenient to operate, readily assembled and installed, and comparatively inexpensive to manufacture.

With these and other objects in view the invention consists of certain novel features of construction as hereinafter shown and described and then specifically pointed out in the claims.

A practical embodiment of the invention is represented in the accompanying drawings forming a part of this specification in which similar characters of reference indicate corresponding parts in all views.

Fig. 1 is a vertical side view of the entire mechanism in its relation to the frame, showing also the controlling clutch pedal in a depressed position.

Fig. 2 is an elevation with the side cover shown partly broken off, the actuating cylinder being shown in section.

Fig. 3 is a plan view with the top cover removed.

Figs. 6 and 7 represent a top and a side view, respectively, of the foot plate and the control buttons.

Figs. 8 and 9 are bottom views of the main shank of the clutch pedal showing the selectively positionable register lever.

Fig. 8a is a sectional view of the register lever.

Fig. 15 is a section taken on the line B—B of Fig. 3 and showing in section the gear shifting members including the selectively positionable driver member.

Fig. 16 is a sectional elevation of one of the shifting members and the driver member taken along the line C—C of Fig. 3.

Fig. 17 is a fragmentary plan view of a portion of the selector mechanism including the step lever and the guiding comb, and showing the selective positions of the register lever with regard to these members.

Fig. 18a is a fragmentary elevation of the selector mechanism including the step lever and the register lever cooperating with the selection transmitting mechanism shown diagrammatically in Figs. 18b and 18c.

Fig. 19 is a vertical section through the step lever and the supporting bracket.

Fig. 20 is a front view of the guiding comb.

Figure 21:
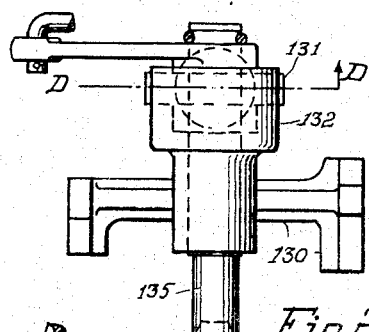
Figure 22:
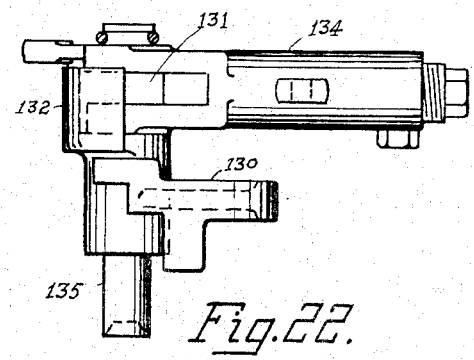
Figure 23:
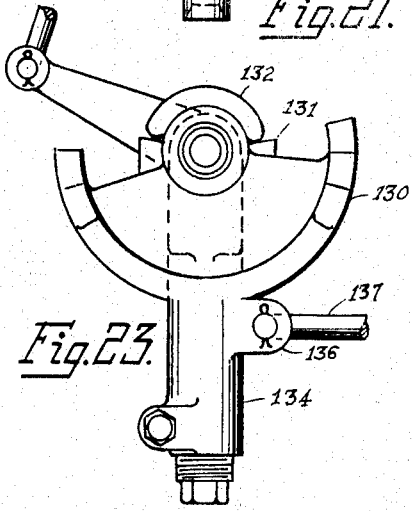
Figure 24:
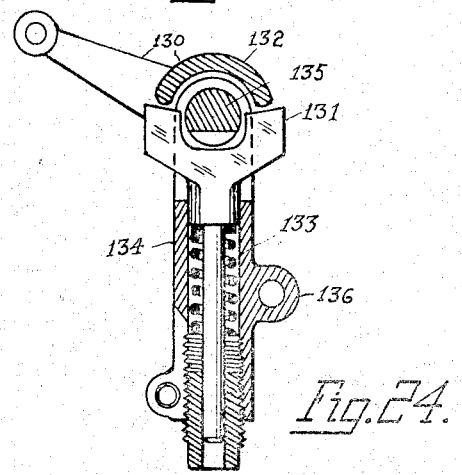

Figs. 21, 22, 23 and 24 illustrate a modification of the selector mechanism. Of these Fig. 21 is a plan view of a modified step lever; Figs. 22 and 23 are mutually perpendicular elevations of the same; and Fig. 24 is a section taken on line D—D of Fig. 21.

Fig. 25 is a section through the cushioning valve taken on line E—E of Fig. 2.

The main parts of the device include the clutch pedal 2 with its associated selector mechanism cooperating with the gear shifting mechanism enclosed within the casing 3, and comprising the cylinder 4, the piston 5, the valve 6 controlling the access of the vacuum to the cylinder; the gears 10, shiftable into engagement by the forks 7 and 8, respectively, secured to, and sliding with the rods 11 and 12, respectively. The forks have integral therewith lower arcuate extensions 13 and 14, respectively, denominated shifting members and actuable by the rocking movement of a single driver member 15 selectively settable with regard to said shifting members. Through the instrumentality of an intermediate transmitting mechanism to be described hereinafter, the driver member 15 is rocked in one direction to shift the gears into engagement by the piston 5 (positive actuation), and is rocked in the opposite direction to neutralize the gears by the neutralizing spring 20.

The clutch pedal 2 turns upon and is supported by the pin 16, the latter being rigidly held to the clutch housing by the bracket 17, as shown in Fig. 3. Rod 21 pivoted at 18 to the extension arm 2a of the clutch pedal 2 serves to operate the clutch (not shown) releasing the same upon depression of the pedal, and allowing the clutch spring (not shown) to reengage the same when the pedal is released. The extension arm 2a of the pedal 2 terminates in a pawl 2b adapted to cooperate with the slotted arm 22 of the three armed tripping lever 25 pivoted to the casing at 19, thereby operating the gear shifting mechanism, as will be subsequently described more in detail, and coordinating said operation with that of the clutch.

The forward and rearward pedal strokes perform as follows: Upon the forward stroke the clutch is disengaged, the gears are neutralized by the spring 20, and the driver member 15 is selectively positioned; upon the rearward stroke vacuum from the engine manifold is admitted into the single-acting cylinder 4 whose piston 5 actuates the driver member to shift the gears, and tensions the neutralizing spring 20 prior to clutch re-engagement.

The piston actuated system includes the piston rod 26 having a pivotal engagement with the shifting lever 27 and causing the same to rock together with the shaft 28 and the previously referred to driver member 15 slidably mounted thereon in virtue of said shaft 28 being turnable in bearings 33 and 34 integral with the casing. It includes also the shifting members 13 and 14 selectively engageable and actuable by the driver member, and the gears 10 shiftable by the forks 7 and 8 integral with the shifting members; it includes, furthermore, the neutralizing spring 20 secured on one side to the casing 3 at 29 by the flathead screw 31 and the nut 32, and on the other side to the arm 26a integral with the piston rod 26, in virtue of which mounting, said spring is tensioned upon the positive actuation of the piston and locked into position together with the entire piston actuated system by proper locking means to be described hereinafter.

Figures 5, 14:
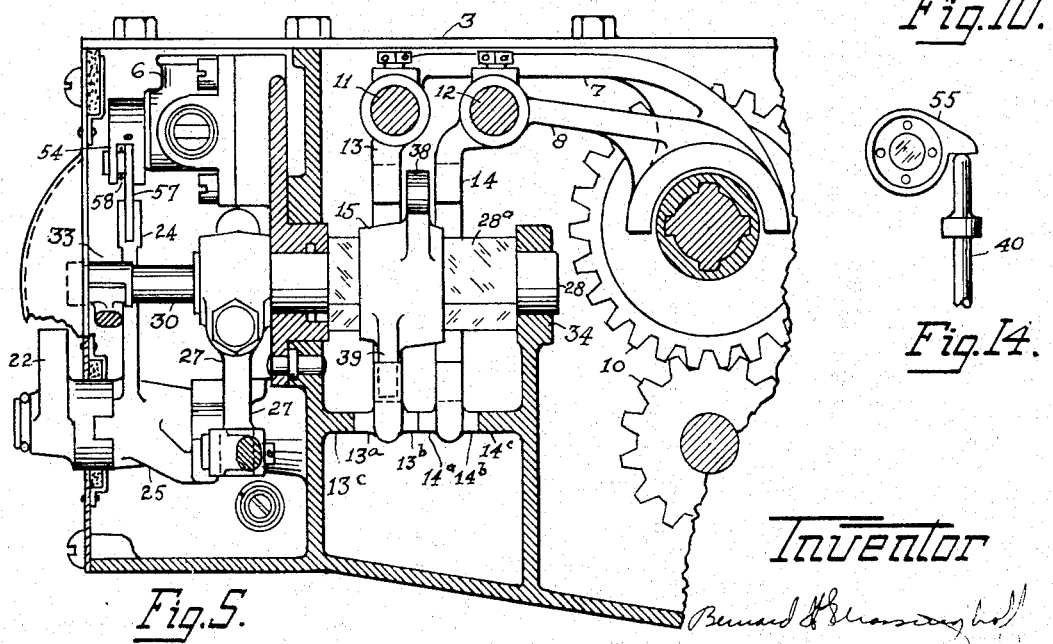
Fig. 5 is a section taken on the line A—A of Fig. 3.

The selective performance of the driver member (15) will now be described with reference to Figs. 5, 15 and 16.

The shaft 28 is hollow and contains a plunger 30 adapted to slide axially within the shaft 28 as result of the selective foot operation, and to engage the driver member 15 causing the same also to slide longitudinally and selectively upon the square portion 28a of the shaft 28. The engagement means between the driver member 15 and the plunger 30 is of the pin-socketed type, the pin 35 being secured rigidly to the driver member and slidable in a circular groove 36 in the plunger 30 when the driver member is rocked with shaft 28, and slidable also in a longitudinal groove 37, channelled in the shaft 28, when the driver member is caused to slide upon the same.

The driver member has two diametrically disposed arms, 38 and 39, respectively, located in different parallel planes. The previously referred to shifting members 13 and 14 are located in parallel planes perpendicular to the planes of the respective forks and are constructed to partially circumvent the shaft 28. The shifting member 13 has an upper slot 41 adapted to be engaged by the upper arm 38 of the driver member, when as result of the sliding movement of the driver member said arm has become located in the plane of said slot. The same shifting member has a lower slot 42 engageable by the lower arm 39 of the driver member upon the corresponding location of the same. The shifting member 14 has likewise an upper slot 43 and a lower slot 44 similarly engageable by the upper and by the lower arms of the driver member as result of the selective sliding of the latter upon the square portion 28a of the shaft 28. The construction and interrelation of parts of the driver member and the shifting members is such that only one slot can be engaged at a time, as will be readily perceived from Figs. 5 and 15.

Referring to Fig. 2 in which all the movable parts are shown in neutral position, it is evident that upon vacuum being admitted into the cylinder 4, the piston 5 will move inward upon its positive stroke causing the shaft 28 and the driver member 15 to swing counter-clockwise. Assuming that previously the latter's upper arm 38 has been brought to coincide with the upper slot 41 of the shifting member 13, (Figs. 5 and 15) the counter-clockwise movement of the driver member will actuate the shifting member 13, as well as the fork 7 associated therewith to the left (Fig. 3) causing the gears to engage for third or high speed. If, on the other hand, the lower arm 39 of the driver member 15 has been brought to coincide with the lower slot 42 of the same shifting member (13), the same positive movement of the driver member will slide said shifting member, as well as the fork and the gears associated therewith to the right (Fig. 3), meshing the latter for second speed. In a similar manner the planar coincidence of the upper on the lower arm of the driver member with either the upper slot 43 or the lower slot 44 of the shifting member 14 will cause said shifting member and the gears associated therewith to slide to the left or to the right (Figs. 3, 5 and 16), meshing the gears for first or for reverse speed, respectively, as result of the same uniform positive rocking movement of the driver member 15.

In Figs. 15 and 16 the driver member 15 is shown in neutral position, its arm 39 engaging slot 44 of the shifting member 14 for the purpose of effecting, upon actuation, reverse speed.

Positive locking means are provided to hold the entire piston actuated system in position against the action of the neutralizing spring, insofar as vacuum to actuate said system is supplied to the cylinder 4 only during the actual positive travel of the piston 5.

These locking means include the pawl-like arm 23 of the previously referred to pedal actuated three-armed tripping lever 25 as well as the shoulder 46 of the previously referred to shifting lever 27, against which the pawl 23 abuts at the end of the positive stroke of the piston (Fig. 4) as result of pawl 2b of the pedal extension 2a pressing upon the extended jaw 22a of the tripping lever 25 during the return stroke of the pedal, which return stroke, it has been indicated, is coincident with the positive actuation of the piston.

Neutralization is brought about by pawl 23 tripping the shoulder 46 of the shifting lever 27 and permitting the neutralizing spring 20 to contract, thereby shifting the gears and the entire piston actuated system to neutral. The above tripping operation is caused by the pedal as follows (Figs. 2 and 4): When the pedal 2 is in its uppermost position its pawl 2b is located outermost as regards the slot 22b of the tripping lever 25. When the pedal is depressed said pawl 2b slides into said slot 22b and by pressing upon its upper jaw 22c turns the tripping lever 25 clockwise until the pawl 23 releases the shoulder 46 of the shifting lever, thereby effecting neutralization (Fig. 2). The latter occurs at about two-thirds of the pedal throw immediately upon clutch release.

Neutral locking means are provided, although not absolutely necessary, and include the shoulder 47 of the shifting lever behind which pawl 23 of the tripping lever drops if at two thirds of the stroke, just after neutralization, the driver releases the pedal. The linkage effecting this includes the pawl 2b of the pedal pressing upon the extended jaw 22a of the tripping lever and turning the latter counter-clockwise (Fig. 2) as result of the pedal being lifted by the clutch spring.

The 3-way valve (6) communicating with the engine manifold by means of pipe 48 and with the cylinder by means of pipe 49 has an inlet port 51, an outlet port 52, an exhaust port 53 and a core 50 rotatable by the arms 54 and 55 securely mounted thereon. The core is held in its normal position which is that of free communication between the outlet and the exhaust ports (Fig. 4) by means of spring 56 causing the arm 55 to press upon the plunger 40 (Figs. 11 and 14) by which it is operable to close the exhaust port as will be presently explained. The other arm 54 is provided with a pivotally connected thereto pendant tripping lever 57 held in an inclined position by a spring 58.

Figure 4:
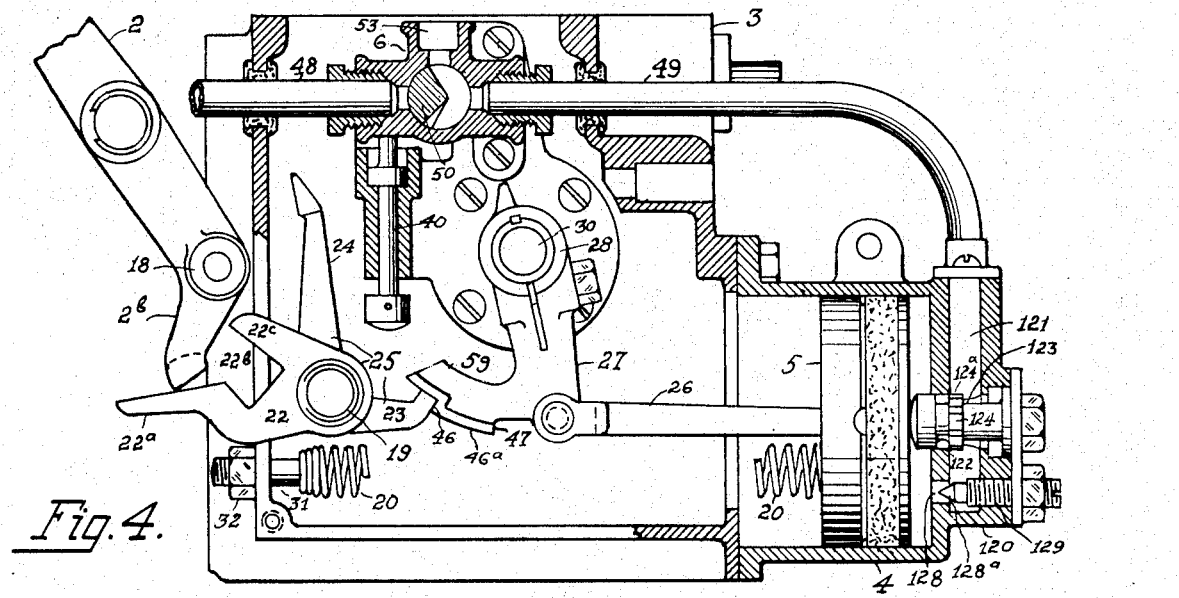
Fig. 4 is an elevation similar to Fig. 2, and showing a section through the control valve.
Figures 10, 11, 12, 13:
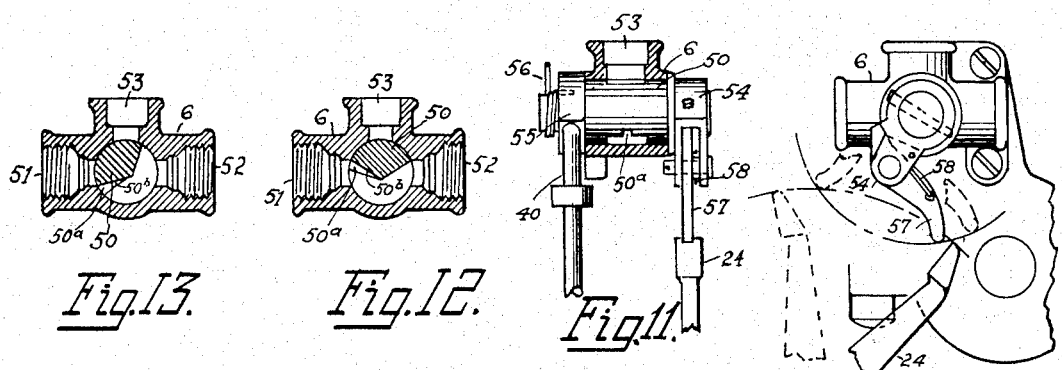
Figs. 10, 11, 12, 13 and 14 are various views and sections of the control valve illustrating its operation.

The operation of the valve is as follows: Upon depression of the pedal two-thirds of the throw the system is neutralized as hereinbefore set forth, and the shifting lever 27 while swinging clockwise on its neutralizing movement lifts the plunger 40 by means of its arm 59, (Figs. 2 and 4) whereby causing the valve arm 55 to close the exhaust port 53 (Fig. 13). Upon further depression of the pedal the third arm 24 of the tripping lever 25 wipes the overhanging valve trip lever 57 without affecting the valve (Fig. 10). Upon the return movement of the pedal, however, and preferably at the beginning of the same, said arm 24 engages said tripping lever 57 thereby rotating the core of the valve to open the inlet port and admit vacuum into the cylinder (Figs. 10, 11 and 12). The interval during which the inlet port remains open is only a brief one, sufficient to cause the positive actuation of the piston insofar as the contour and the relative movement of the valve trip lever 57 are such as to permit the latter upon continued return movement of the pedal to escape its engagement with the arm 24 of the tripping lever allowing the spring 56 to close the inlet port and open the exhaust port (Figs. 10 and 4). This occurs after the gears had been locked into position, as hereinbefore set forth, and prior to the impending clutch re-engagement.

Safety locking means operating to prevent— (A) the closing of the inlet port and (B) clutch re-engagement unless the gears are fully meshed and locked into position, are provided and include in the first place the arcuate periphery 46a of the shifting lever 27 between the shoulders 46 and 47. It is evident that while the gears are being shifted the pawl 23 of the tripping lever 25 is compelled to ride upon said periphery thus keeping arm 24 of the tripping lever to the right of (Figs. 2 and 4), and in functional engagement with the valve trip lever 57. This continues until pawl 23 drops behind the shoulder 46 to lock the gears into position causing said arm 24 to swing counter-clockwise and permit the escape of the valve trip lever 57 to close the inlet port.

It is evident also that while pawl 23 is riding upon periphery 46a and until it drops either behind shoulder 46, which is equivalent to a full meshing of the gears, or until it reaches behind shoulder 47, which is equivalent to complete neutralization, the clutch pedal 2 cannot swing upward to reengage the clutch in virtue of its engagement with the slotted arm 22 of the tripping lever 25 of which the pawl 23 is a part. Consequently the clutch cannot be reengaged until the gears are fully meshed.

The selector mechanism by means of which the driver member 15 is selectively positionable upon shaft 28 to selectively mesh the gears, as hereinbefore set forth, includes the central foot rest 60 integral with the pedal 2 and two further foot contact buttons 61 and 62, each of said foot contacts and said foot rest being marked respectively (1), (2), and (3) to signify the various speeds obtainable through their respective operation. The two buttons 61 and 62 are integral with the button lever 63 co-extensive with the upper arm of the pedal lever 2 and offset with regard to the center line between the two buttons in which center line all three of these integral members are pivoted to the pedal lever 2 at 64 (Figs. 1 and 7) so that a preponderant pressure upon either 61 or 62 button will cause the lower end of the button lever 63 to swing to one side or to the other. A second oscillating lever 65 denominated the "register lever" is pivoted to the main shank of the pedal lever at 66 and has its free end linked with the free end of the button lever 63 by means of the collar 67 and the anti-rattling spring 68 in a manner to permit both of these levers to swing together about their respective pivoting points as result of said preponderant foot pressure upon either button 61 or 62. Normally the above oscillating lever system is kept in a central position in line with the pedal lever by the tensioned centering springs 69 secured to the main shank of the pedal and adapted to oppose the deviation of the oscillating levers from the plane of the pedal lever 2.

The register lever 65 has on its lower side two projections 71 and 72 whose function it is to fall in selectively with the various steps of the step lever 70 located below the pedal and in the line of its movement.

Said step lever 70 is supported by and is turnable upon the pivot pin 73, the latter being in turn secured to the bracket 91 rigidly mounted on the frame. The periphery of step lever 70 is in the form of a partial cylindrical surface indented in the form of steps, of which there are five, namely; 74, 75, 76, 77 and 78, respectively (Figs. 18a, 17 and 19). Of these, 75 and 76 are cooperative, being diametrically disposed and located directly in the plane of the pedal lever. Steps 77 and 78 are likewise cooperative and diametrically disposed with regard to the axis of rotation of the step lever, being furthermore located to one side of the vertical plane of the pedal lever. Step 74 located to the other side of said plane has no companion step on the opposite side of the axis of rotation, for the purpose as will appear later. Steps 76 and 77 located on the same side of the step lever bearing are furthermore adapted to cooperate with the upper projection 71 of the register lever when the pedal is depressed; and steps 74, 75 and 78 cooperate in a similar manner with the lower projection 72 of the same.

It having been indicated that the register lever 65 is oscillable through foot operation to either side of the pedal lever plane, thereby causing its projections to fall in selectively with the corresponding steps of the step lever 70, it is evident that upon the depression of the pedal said step lever 70 will be rotated through a definite angle depending upon which of its five steps coincides first with the respective projection of the register lever 65. It is evident also that said rotation will come to a stop, and the step lever will be definitely positioned when both, the pedal movement and the rotation of the step lever caused by the same, are arrested. The first of these comes to a halt when the rubber cushioned stop 65a located on the register lever 65 midway between the two projections 71 and 72 comes up against the bearing 81 of the step lever 70. The second, namely, the rotation of the step lever, is likewise simultaneously arrested in virtue of the fact that the step cooperating with the one which has been depressed first by the respective projection of the register lever simultaneously comes up against the other projection of the register lever on the opposite side of the axis of rotation of the step lever, thus positively and selectively positioning said step lever at the end of the downward pedal stroke.

When said positioning of the step lever is effected through the instrumentality of step 74, which, as has been indicated, has no companion step, a special stopping arrangement is provided which will be subsequently described.

In virtue of the pivoting arrangement described the two contact buttons 61 and 62 are lightly yieldable with regard to the foot rest 60, the yielding movement causing as above set forth, the selective oscillation of the button lever 63 and the selective positioning of the register lever 65 associated therewith upon the step lever 70. In virtue of the design of the respective levers and the location of their pivoting points, the actual yielding movement of each of the contact buttons 61 and 62 is of the nature of approximately $\frac{1}{16}$" for each selective positioning of register lever 65.

It has been stated that normally the oscillating lever system is kept in a central position in line with the pedal lever by the previously referred to centering springs 69. These cooperate with the four pronged guiding comb 99 to make the selection definite and infallible; said guiding comb having three slots 101, 102 and 103 corresponding to the three selective positions of the register lever and adapted to receive the tapered nose 100 of said lever upon depression of the pedal and to guide the same in the plane of the respective steps. The entrances to the slots are made suitably wider than the slots themselves.

In order to suitably brake the turning movement of the step lever 70, and in order to hold the same in position after the retraction of the pedal, a plunger 96, mounted inside the step lever 70 is provided, being made to press against a groove 97 in the pivoting pin 73 by the spring 98.

The selective positioning of step lever 70 is converted into the previously described selective positioning of the driver member 15 through the instrumentality of four intermediate links (Figs. 1, 2, 18a, 18b, and 18c), one of which has been described as the plunger 30 associated with the driver member 15 and sliding within the shaft 28 to position said driver member selectively. The other three include the rod 80 having one of its ends linked with the arm 79 integral with the step lever 70 and radially projecting therefrom; the dink 81a pivotally connected to the other end of said rod 80; and the rectangular lever 82, to the vertical shank 82a of which said link 81a is bolted, said shank being rotatable in, and supported by the bearing 83 integral with the casing 3 (Fig. 2). The horizontal arm 82b of lever 82 on the other hand, engages a slot 87 of the previously referred to plunger 30, said slot engagement being sufficiently loose to permit a slight amount of sliding, thereby making possible the conversion of the rotational movement of the horizontal arm of lever 82 into the selective sliding movement of plunger 30.

The foot contact buttons 61 and 62 are shown as located each in a somewhat higher and inclined plane with regard to the central foot rest 60, although this is not a necessary condition and without any loss in efficiency the three contact surfaces could be located in the same plane, or the buttons 61 and 62 might have been positioned even below said central foot rest 60.

The speed-selective operation

Assuming now that regardless of the previous positioning of the selecting mechanism, the operator wishes to accomplish second speed, he places his foot upon the central foot rest 60, marked (2), and depresses the pedal. In this case there is no deviation of the oscillating levers from the plane of the pedal lever and since, as has been indicated, steps 75 and 76 are permanently located in said plane, either projection 71 of the register lever 70 will contact with step 76, and upon continued depression of the pedal turn the step lever until the cooperating step 75 has come up against the other projection 72 of the register lever, or, depending upon the previous positioning of the step lever 70, it may be that projection 72 will first contact with step 75 and turn the step lever until the other projection 71 has come up against step 76. In either case, the final positioning of step lever 70 will be that for second speed, which through the previously described linkage will be directly transmitted to the driver member 15 to position the same also for second speed as previously set forth.

If now the operator wishes to accomplish third speed, he places his foot to the upper right so that it covers the button 62 marked (3) and depresses the pedal. If he so wishes he may slightly tilt his foot so as to accentuate the pressure upon button 62. This, however, is not absolutely necessary, since button 62 being lightly yieldable, the mere placement of the foot over the same and the normal depression of the pedal will cause said button to yield the $\frac{1}{16}"$ necessary for the selective positioning of the register lever 65 over the step lever 70. Depending upon the previous positioning of said last lever, one of the projections of the register lever will collide with either step 77 or step 78 and turn the step lever until it is positioned for third speed, the positioning movement being, as above set forth, transmitted directly to the driver member 15.

For first speed the driver places his foot upon the pedal so that it covers contact button 61, marked (1) and depresses the pedal in a similar manner as for third speed. The pressure of the foot will automatically depress button 61 approximately $\frac{1}{16}"$ and swing levers 63 and 65 to the right where the projection 72 of lever 65 will come to face step 74 of step lever 70. Upon the depression of the pedal, said projection will impinge upon said step and cause the rotation of the step lever. It having been indicated that in this case step 74 has no companion step to mark the end of the positioning movement of the step lever, said movement is in this case brought to a halt by the plunger 90 mounted upon the bracket 91 and held by a spring 92 in a position to oppose the further rotation of the step lever, by pressing upon the extended step 78, thereby positioning the step lever and the entire selective mechanism for first speed.

In order to position the step lever 70 and the dependent selective mechanism for reverse speed, the former must be rotated against the action of the plunger 90 and spring 92. This cannot be done by the foot on account of the bearing 81 of the step lever 70 arresting the further movement of the pedal, but it must be done by the hand. The reason for designing the selective mechanism so that it requires an additional hand operation for reverse is to safeguard the operator against inadvertently meshing the gears for reverse while the vehicle is moving forward, with the consequent disastrous results for the transmission mechanism; and a further reason is the respective simplification of the pedal resulting from the limitation of the number of the pedal buttons to two. The hand operative means for reverse comprise the arm 93 rigidly mounted upon, or integral with bearing 81 of the step lever and operable to rotate the same through a pull rod 94 linked to said arm and held coextensive with the steering column S by a ring R within which said rod slides. Its free end is provided with a handle 95 located within easy reach of the operator (Fig. 1).

For reverse, therefore, the pedal is depressed as for first speed until the end of the stroke. Simultaneously or subsequently the operator pulls the handle 95 to its uppermost position which rotates the step lever against the action of the spring 92 and positions the entire selective mechanism for reverse. The reason why first speed must be selected prior to the operation for reverse is that step 74 of the step lever 70 operative for first has no companion step on the opposite side of the bearing to prevent the further rotation of the step lever as required for reverse.

Upon handle 95 being released the selective mechanism automatically, through the action of the above referred to spring 92, reverts to first.

In accordance with the previous explanation of the operation of the neutralizing spring 20 and the respective locking means, neutral is accomplished in a twofold manner:

A. Neutral is selected by the operator depressing the pedal two-thirds of the normal stroke during which time the clutch is disengaged and at the end of which period the operator feels a slight increase in the pedal resistance indicating that the pedal pawl 2b has slipped into the slot 22b of the tripping lever and is operating to release the neutralizing spring 20, which release requires only approximately $\frac{1}{2}"$ further pedal depression, after which, if the pedal is released, the gears remain in neutral and the clutch is reengaged, and B. The gears are regularly neutralized upon the downward stroke of the pedal and reengaged again upon the rearward stroke as a part of the gear shifting operation without any conscious effort on the part of the operator.

The various positioning of the selector mechanism, including the driver member, for first, second, third and reverse speeds is shown diagrammatically in Figs. 15, 17, 18a, 18b and 18c.

The combined operation of the device is as follows: The operator having decided upon the desired speed places his foot accordingly and depresses the pedal. The first two-thirds of the downward stroke operates to release the clutch. Upon continued depression of the pawl 2b integral with the pedal lever enters the slot 22b of the tripping lever and begins to turn the same to release the neutralizing spring 20. This latter operation is accomplished upon further ⅜"-½" (approximately) movement of the pedal. In the course of the neutralizing movement of the system the arm 59 of the shifting lever lifts the plunger 48 to close the exhaust port 53 of the valve. During the further downward movement of the pedal (last third of the stroke) the arm 24 of the tripping lever 25 passes behind the pendant valve trip lever 57, while at the same time the pedal actuated register lever 65 selectively sets the step lever 70, and consequently also the driver member 15 into position.

With the beginning of the rearward stroke of the pedal, which is now actuated solely by the clutch spring, the arm 24 of the tripping lever engages the pendant trip lever 57 of the valve and opens the inlet port which, as hereinbefore set forth, operates to shift the gears into position. This occurs in the first third of the rearward stroke of the pedal. At this time the positive piston stroke being completed, the pawl 23 of the tripping lever 25 slips behind the shoulder 46 of the shifting lever to lock the system into functional engagement, permitting thereby the valve tripping lever 57 to escape and close the inlet port opening the exhaust port. The remaining two thirds of the rearward stroke are occupied by the clutch re-engagement.

Synchronization

It having been set forth that the gears are neutralized on the downward stroke of the pedal and reengaged on the upward stroke, it is evident that this arrangement provides a spontaneous synchronization pause between the two operations as result of which a smooth and noiseless meshing of the gears is attained without conscious effort on the side of the operator. The pause can be furthermore adapted to the consistency of the oil.

Positive selection is a feature of the selector mechanism in virtue of the fact that entire selective operation, whether performed by the foot or by the hand (for reverse) is directly and simultaneously transmitted to the driver member 15 as the final selective agent.

Emergency means are provided for the purpose of shifting the gears by hand in the case of power failure. These include the arm 106 integral with the shifting lever 27 and rotatable by the plunger 107 normally kept in inoperative position by the spring 108. The plunger 107 is pushed against the arm 106 to rotate the shifting lever 27 for gear engagement by the bell-crank lever 109, which in turn is actuated by the operator pulling the conveniently located handle 110 of the rod 111 pivoted to said bell crank lever 109 (Figs. 1 and 2). It is evident that the pressure of the plunger 107 against the arm 106 is similar to the piston pressure as far as the final result is concerned. It is evident also that in order to shift the gears by the emergency leverage, the respective gear must be first selected by the foot in a similar manner as for power operation, e. g. the pedal must be first selectively depressed.

Accessory features

For the purpose of reducing the momentum of the piston-actuated system at the end of its positive stroke with a view of smooth and quiet meshing of the gears, an auxiliary, so-called cushioning, valve 120 is shown associated with the cylinder 4 and operable by the piston 5 (Figs. 2 and 4). It comprises an air chamber 121 communicating with the control valve 6 and serving to admit vacuum to the cylinder through a central orifice 122 in the cylinder head closable by the plunger type of core 123 having splined ports 124 (Figs. 4 and 25) between the short radial ribs 124a. The spring 125 located inside the core and causing the same to project into the cylinder until flange 126 of the core abuts against flange 127 of the body of the valve operates to keep said ports open with regard to vacuum passage to the cylinder. The ports are closable by the piston at the end of the stroke as the latter presses against the core 123 and moves the same out of the cylinder and into the valve (Fig. 4). There is also a by-pass 128 provided in the cylinder head which remains permanently open. Evidently when the ports 124 are closed by the piston the vacuum pressure in the cylinder is reduced in proportion to the width of the by-pass 128, thus reducing also the final momentum of the piston actuated system. The width of the by-pass 128 can be regulated by the pin 129 having a screw-threaded engagement with the body of the valve permitting its tapered end 128a to be screwed in and out of the orifice. A further function of the by-pass 128 is to compensate for eventual air leakage around the piston.

A further cushioning arrangement for the purpose of gradually reducing the operative vacuum pressure is provided and is associated with the control valve 6. It consists in a radially tapering groove 50a upon the straight side 50b of the core 50 cooperating with the inlet port 51. It is obvious that when the core is turned to close the passage of vacuum, said groove 50a will remain open for a space of time after the normal closing of the valve, thus reducing the vacuum pressure in proportion to its width and contour, and contributing to a smooth meshing of the gears.

From what has been stated as regards the hand operation for reverse and the respective leverage, it will be readily understood that for every selection the pull rod 94 coextensive with the steering column 8 and positively linked with the step lever 70, will move along said column an amount corresponding to the position of the step lever. Consequently an indicator finger 94a could be affixed, if desired (Fig. 1), upon said pull rod and the various positions marked upon the steering column as at 8' to indicate the respective speeds.

From what has been stated of the operation of the piston actuated system, it is evident that the driver member 15 is actuated by the piston to shift the gears diversely and selectively always in the same direction (counter-clockwise, Fig. 2) and always through the same angle of rotation corresponding to the piston stroke. Since the individual gears require a different amount of sliding this circumstance is accounted for by the different width of the slots 41, 42, 43 and 44 of the shifting members 13 and 14 receiving the arms 38 and 39 of the driver member 15, said different width providing for lost motion of said arms within said slots when the sliding movement of the respective gear does not require the entire driver-member stroke.

To hold the shifting members firmly in their respective planes of movement they are provided with mutually slidable guiding ribs 13a, 13b, 14a and 14b. The two outside ribs 13a and 14b are slidably encompassed between two further ribs 13c and 14c integral with the casing.

In order to filter the dust out of the air admitted into the casing as result of the piston movement, felt covered ports 99 (Fig. 1) are provided to serve as air passages.

Non-positive (modified) selection

In certain cases it may be desirable to interpose a spring between the initial selection means and the final selection means so as to time the transmission of the operative movement between the two. The desirability of such an arrangement arises, for instance, when, for the purpose of reducing the extent of the pedal stroke, the neutralization point has been relegated to the very end of the downward stroke of the pedal so that it almost coincides with the selective setting of the step lever. In such a case it may happen that the pedal actuated register lever comes up against the step lever before the gears have been neutralized. In the device as described this would result in the pedal movement becoming arrested before completing the selection because the step lever cannot rotate until the driver member has been shifted to neutral on account of the non-engaged arm of said member being locked by the body of the adjacent shifting member. In order to permit in this case the further movement of the pedal necessary for the neutralization of the gears and the completion of the selection, a spring can be associated with the step lever so as to oppose its movement and take up the further travel of the pedal while at the same time storing energy for the completion of the selection.

A modified selector of this type is shown in Figs. 21, 22, 23 and 24, in which 130 designates the step lever proper held in a central position by the yieldable fork 131, the latter being pressed against the arcuate extension 132 of the step lever bearing by the spring 133 contained in the cylindrical casing 134. Said cylindrical casing is rotatably secured to the pin 135 in a similar manner as the step lever 130 and has an arm 136 to which is linked the rod 137 identical with rod 80 of the preferred embodiment and serving to link the primary selection means associated with the pedal with the secondary selection means within the casing 3.

It is evident that in this case the step lever positioning is transmitted to the driver member only after the spring 133 has been sufficiently compressed as result of the turning movement of the step lever and the pressure of its arcuate extension 132 upon the fork 131 to swing the casing 134 and shift said rod 137. It is evident also that should the casing 134 remain rigid because the driver member has not yet been shifted to neutral, the pedal will continue to move together with the step lever compressing the spring 133 whose energy will be released to selectively position the driver member as soon as the latter has been neutralized in virtue of said further movement of the pedal.

It is evident from the foregoing that a gear shifting device such as described could be readily made operable with compressed air or with any other type of fluid pressure means; and that its essential features could be adapted and made operable with any other type of power without departing from the spirit of my invention.

It is evident also that the rôles of the piston and the neutralizing spring could be reversed without substantially modifying the device.

It is further evident that with minor modifications said device could be readily adapted to operate a four-speed transmission system.

It being further understood that other changes and modifications could be made without departing from the spirit of my invention, I, therefore, do not wish to be limited by the particular structure described, but aim to cover all such modifications as come within the scope of the appended claims.

Having thus described my invention, what I claim is:

1. In a motor vehicle in combination with a variable speed transmission system a power actuated device for controlling the operation of said system including a combined selecting and operation directing mechanism unidirectionally actuable by the operator and self-sufficient for effecting either out of a plurality of speed selections by a single reciprocable actuation of said mechanism, and means whereby the prior speed is disengaged upon actuation of said mechanism in one direction and a new speed ratio effected upon its actuation in the other direction.

2. In a motor vehicle a prime mover of the cylinder and piston type, a propeller shaft revolvable by said pistons, a second shaft revolvable by said first shaft for a plurality of driving relations through the agency of selectively engageable transmission elements, and means including a further single cylinder and piston unit energized by said prime mover for selectively engaging said transmission elements in response solely to selective foot operation of a single controlling lever.

3. A fluid power actuable ratio change device including diversely operable ratio change effecting members, a pedally directed selector mechanism to determine the desired operation of said members, and a single cylinder to actuate said members selectively through the instrumentality of a single controller.

4. A device as claimed in the preceding claim operated through the instrumentality of the clutch pedal and positively actuated upon the return stroke of the same.

5. In a device as applied to a motor vehicle to effect selectively a plurality of driving relations in response solely to selective operation of a foot controller, means for operatively registering said selective foot operations and a single unidirectionally energizable power unit operating through said last means to effect selectively said driving relations.

6. In a motor vehicle in combination with a clutch pedal of a mechanism for selectively shifting a plurality of transmission elements in and out of engagement, a unidirectionally energizable power actuator to perform the shifting operation through the instrumentality of selectively settable intermediate means and means associated with said pedal to perform the selective setting operation concurrently with the clutch operation.

7. In a device as claimed in the preceding claim said clutch operation being performed at the beginning of the forward stroke and at the end of the rearward stroke and said unidirectional actuation being performed at the beginning of the rearward stroke.

8. A pedally controlled speed change dev. for motor vehicles including speed change effecting means, fluid power means for actuating said first means, selector means for determining the operation of said first means, and means for completing said determination on the forward stroke of the pedal and for effecting said actuation on the rearward stroke of the pedal.

9. A pedally operable power actuated automobile transmission control device including means for operatively selecting the desired transmission ratio on the forward throw of said pedal and means for applying said power to effect said ratio on the rearward stroke of the pedal.

10. An automobile transmission control device in combination with a source of power, a reciprocally movable operator directed controller for said device, means for selecting the desired transmission ratio and for setting said mechanism in prefunctioning condition by a single movement of said controller in one direction and for applying said power to completely effect said ratio by a similar movement in the opposite direction.

11. A speed change device for automobiles including a power actuator operating through the instrumentality of shiftable members to effect a plurality of ratio changes as directed by the operator through the agency of a selector mechanism, tensionable neutralizing means for said members opposing the positive movement of said actuator and said members and lever means for automatically locking said neutralizing means when tensioned.

12. A power actuated speed change device including a control lever; speed change effecting members, selector means for said members, neutralizing means for the same, and means for applying said power to positively operate said members according to previous selection and pre-functionally operate said neutralizing means, all of said means being operable in the course of a single reciprocal stroke of said control lever.

13. In a power operable device to control selectively the speed of a motor vehicle, speed changing members selectively shiftable into functional engagement by a single unidirectionally energizable actuator unit and out of engagement by means tensionable by said actuator, and an intermediately operative coordinating mechanism including a foot operated controller for directing the operation of said device.

14. In a device as claimed in the preceding claim said controller being the clutch pedal, said members being shifted out of engagement upon partial depression of said pedal and into engagement at the beginning of the return stroke of the same and said power originating in the engine generated vacuum.

15. A power actuated ratio change device including ratio change effecting means, selector means for the same tensionable neutralizing means for the same and a reciprocally movable controller to neutralize and select said ratio change effecting means on its forward stroke and to cause said power to simultaneously tension said neutralizing means and positively operate said ratio change effecting means on its rearward stroke.

16. A device as claimed in claim 15 including means for transiently applying said power at the beginning of the rearward stroke, and means for locking said ratio change effecting means and said neutralizing means when in functional engagement and when in neutral.

17. A selective power actuated automatic gear shifting device for automobiles including a reciprocally movable controller for said device, shifting means for throwing the selected gear into engagement, power means for positively actuating the shifting means, neutralizing means for disengaging the shiftable gears and means cooperating with all of said means for causing the disengaging and the selective operations to occur when said controller is moved in one direction and the positive shifting operation when said controller is moved in the opposite direction, thereby introducing a pause between two consecutive engagements.

18. In a device as claimed in the preceding claim, said power being identical with the engine generated vacuum pressure and said controller being mounted upon the clutch pedal and cooperating therewith.

19. In combination with a clutch pedal, a selector mechanism cooperable therewith, a speed ratio change device actuated by fluid power as directed by said selector mechanism and further means associated with said mechanism to cause said actuation to occur on the return stroke of said pedal.

20. In combination with a depressible pedal and a power actuator a ratio change device including members diversely and selectively movable by said actuator into a plurality of ratio engagements, neutralizing means for said members and an operator controlled directing and coordinating lever system for said members, said actuator, and said means for causing the neutralization of said members to occur at a partial depression of said pedal and their actuation at the return throw of the same.

21. In a motor vehicle propelled through the agency of a gear transmission system, a device to control the operation of said system for a plurality of speeds including a fluid power actuator for switching the individual gears into engagement, as directed by a combined selector and a selection registering mechanism and means including a depressible pedal for completely operating said last mechanism on the downward stroke of the pedal and said actuator on the upward stroke of the same.

22. In a device as claimed in the preceding claim, said pedal being the clutch pedal and said actuator being positively energized at the beginning of the return stroke of said pedal.

23. In combination with a clutch control lever, a ratio change device for engaging and disengaging members into various ratio changes for automobiles, including such ratio changing members actuated for ratio engagement by power means through the instrumentality of an intermediately and diversely operative directive mechanism, and means associated with said mechanism and controlled through the instrumentality of said lever to cause said engagement actuation to occur on the return stroke of said lever.

24. In combination with a pedal, a ratio change device for automobiles including ratio changing members selectively actuated by power means through the instrumentality of an intermediately operative operator controlled selective and directive mechanism, and means associated with said mechanism to cause said actuation to occur on the return stroke of the pedal, said pedal having a clutch controlling function and said power being of the fluid pressure type effectively applicable in the first part of the return stroke of said pedal.

25. In a motor vehicle in combination with a source of power a plurality of transmission elements and a speed control device including clutch pedal operable selection means, power means, shifting means actuated by said power, neutralizing means and further means cooperating with all of said means to consecutively disengage the clutch, neutralize said transmission elements and register a selection on the forward stroke of said pedal, and to consecutively and functionally re-engage the selected transmission elements and re-engage the clutch on the rearward stroke of said pedal.

26. A device as claimed in the preceding claim operable by engine generated pneumatic pressure, including cooperating locking means for said transmission elements and means operative to apply said pressure solely to positively actuate said shifting means.

27. A power actuated speed change device for automobiles operable for a plurality of speed selections by a single reciprocally movable operator actuated controller and including automatically operable power dispensing means, positively operable upon the return throw of said controller.

28. In a device as claimed in the preceding claim said controller being the clutch pedal, said power being of the pneumatic type and said power dispensing means being a valve operable to dispense power solely in the first part of the return stroke of said pedal.

29. An automobile speed change device including members movable to effect a plurality of speed changes, fluid power means for actuating said members, valve means to control the effective application of said power, and means automatically actuable by said members for operating said valve means.

30. In a pedally operated ratio change device for automobiles fluid power means for effecting the ratio changes through the instrumentality of intermediate operative means including a power dispensing valve having means associated therewith to effectively apply said power at the beginning of the return stroke of said pedal in a predetermined gradual manner.

31. A device for controlling the normal function of an automobile through the instrumentality of the clutch pedal including a plurality of selectively shiftable members, means associated with said pedal for transmitting the desired selection to said members, means for effecting said selection concurrently with the clutch operation, and locking means for preventing the clutch operating movement of said pedal until said members have been shifted to effect the selections.

32. In an automobile in combination with a source of power a ratio change device including a pedal selector, power means for selectively shifting the ration change effecting means in response to selective foot operation, means for transiently applying said power solely to effect said shifting operation on the return stroke of said pedal, and means distinct from said power for automatically locking said ratio change effecting means when in functional engagement and when in neutral 33. A ratio change device for automobiles including in combination diversely operable ratio change effecting members, a power actuator for said members, a reciprocally movable pedal, and means associated with said pedal to operate said device for a plurality of selections by strictly unidirectional reciprocal movements of the foot operating said pedal.

34. A ratio change device for automobiles including in combination diversely operable ratio change effecting means, a power actuator for said means and a selector mechanism to direct said actuation including a pedal having a plurality of relatively yieldable foot contact surfaces effective for selection determination through selective preponderant foot pressure upon either of said surfaces.

35. In an automobile a depressible pedal controller for a power actuated speed change device having a plurality of foot contact surfaces, one of said surfaces being rigid with regard to the main body of the pedal lever, the other surfaces being lightly yieldable with regard to said first surface and means for effecting a speed selection in response to a preponderant pressure upon either of said surfaces.

36. In a device as claimed in the preceding claim, said controller being the clutch pedal, said actuator being operable by fluid power and said preponderant foot pressure being of the nature of the conventional clutch operation for every selection.

37. In an automobile, a selective speed control device including members operable for a plurality of speed selections by a power actuator as directed by the operator's foot through the instrumentality of a pedal having relatively movable for selection foot contact portions and a coordinating mechanism intermediate said pedal, said actuator and said members, said pedal being adapted to operate the clutch in the upper part of its reciprocal stroke, said actuator being operable by fluid power, and said coordinating mechanism including members selectively oscillatable by said movable foot contacts for selectively setting a selection registering mechanism associated with said members.

38. In a power actuated ratio change device for automobiles, ratio change effecting members actuated by said power, foot operable primary selection means including selectively oscillatable means, secondary selection means associated with said ratio change effecting members and means for positively translating the proportioned oscillations of said oscillatable means into selective setting of said secondary selection means.

39. In a power actuated automobile speed control device of the type operable through the instrumentality of a pedal selector, selection initiating means, selection completing means, and further means to positively transmit the foot selective operation from said selection initiating means to said completing means.

40. A power operable transmission control device including means for selectively throwing in and out of engagement the individual transmission elements through the instrumentality of a single intermediate actuating agent associated therewith according to the setting of said agent as directed by a single operator manipulated selection and operation control.

41. In an automobile a power actuated device for effecting a plurality of speed ratios including ratio change effecting members, means for selectively determining the operation of said members comprising primary foot operated selection means directing secondary registering means associated with said members, and further means for directing said secondary means in other manner than said foot operation.

42. In a device as claimed in the preceding claim, said power being of the fluid pressure type and said foot operation being effected through the instrumentality of the clutch pedal.

43. A power actuated automobile speed control device of the type selectively operable by a foot controller including power actuated speed change effecting members, an intermediate lever system for directing said power to operate said members for a plurality of speeds, and further specially operable by the driver control means for directing said lever system to control at least one selection.

44. In a device as claimed in the preceding claim said special control means being hand operable and the selection controlled thereby being reverse speed.

45. In a device as claimed in claim 43 tensionable means for automatically restoring the reverse selection means to pre-functional state after operation.

46. In a motor vehicle, a speed change device actuated by power means for a plurality of speed changes as directed by the operator through the instrumentality of a foot-operable selector mechanism and further means for effecting said plurality of speed changes independent of said power means.

47. In a motor vehicle in combination with a source of power a speed change mechanism including speed change effecting members, means for selectively directing said power to operate said members for a plurality of speed changes and further specially and directly operable means associated with said speed change effecting members operatively equivalent to said power means.

48. In a device as claimed in the preceding claim said further means being manually operable for the entire range of speed ratio changes.

49. A device as claimed in claim 47 actuated by engine generated pneumatic pressure and selectively controlled through the instrumentality of the clutch pedal.

50. In a motor vehicle in combination with an unidirectionally energizable source of power and clutch operating means a speed ratio change device including means for selecting a plurality of forward speeds solely by foot-operation, power operable ratio change effecting means, and means for cooperatively combining said power operation and said clutch operation.

51. A device as claimed in the preceding claim operated by fluid power means.

52. In combination with a source of power and a normal function performing pedal a speed ratio change mechanism including power-actuated gear shifting members and an intermediately operating directing mechanism including primary selection means associated with said pedal and secondary selection means associated with said gear shifting members.

53. In a fluid power operable ratio change device for automobiles power means for effecting the ratio changes including members actuated by said power and automatically operable power control means for controlling the acceleration of said members.

54. In an automobile a transmission control device operable by fluid power including a cylinder and piston actuator and valve control means operable concurrently with the piston to automatically control the rate of the application of said power to said piston.

55. In a device as claimed in the preceding claim said means being a valve operable by said piston in the latter part of its positive stroke.

56. In a pedally controlled power actuated ratio change device for automobiles ratio change effecting members, secondary selection means associated with said members and primary selection means associated with said pedal, and tensionable means operative intermediately said primary and said secondary means to control the transmission of the foot selective operation between said last two means.

57. A fluid power operable pedally controllable ratio change device for automobiles including power means for actuating ratio change effecting members, means for causing said actuation to occur on the return stroke of said pedal and means for confining the functional application of said power only to the period necessary for actually performing said ratio changes.

58. In a motor vehicle in combination with a source of power and a pedal controller, a driving ratio change device embodying primary selection means cooperable with said controller and selectively positionable by a mere placement of the foot thereon, secondary selection means operable to register the selections upon bodily movement of said controller, and ratio change effecting means actuable by said power according to said selections.

59. In a power operable driving ratio change device for automobiles, a pedal, initial selection means associated with said pedal and operable by selective placement of the foot upon the same, selection registering means operable upon depression of said pedal, tensionable energy storing means, ratio change effecting means and power actuable means for actuating said last means and said energy storing means.

60. A device as claimed in the preceding claim actuable to effect the selected speed upon the return stroke of said pedal.

61. In combination with a source of power a depressible pedal, diversely operable ratio change effecting means for accomplishing a plurality of speeds, selection initiating means cooperable with said pedal, selection registering means associated with said ratio change effecting means, and means for directly and positively transmitting the selection from said initiating means to said registering means upon depression of said pedal.

62. In an automobile in combination with a source of power and a clutch pedal, a speed changing device including power actuable means for effecting the speed changes, selection means, speed indicating means, and means to operate all of said means to accomplish the selected speed by a conventional depression of said pedal.

63. In combination with a source of power and a reciprocally movable control lever, an automobile speed change device including clutch operating means, selection means associated with said lever, power operable speed changing means, and means for cooperatively combining said power operation and said clutch operation, causing the speed change to occur on the return stroke of said control lever.

64. In combination with a source of power, an automobile transmission control device including selectively shiftable transmission elements actuable by power means and by tensionable means, pedally operable selection means, and means for shifting said elements in one direction by said power means and in another direction by said tensionable means.

65. In a motor vehicle, in combination with a source of power, a ratio change mechanism including ratio change members, means for applying said power to move said members for a plurality of ratio changes, and further means normally accessible to and reciprocable by the driver, effecting a plurality of ratio changes independently of said power by effectively unidirectional motion in a single plane.

66. An automobile speed change device including members operable to effect a plurality of speed changes, fluid power means for operating said members to effect said changes, valve means for applying said power, and further valve means for modifying the speed of flow of said power for slowing the final stage of the change effecting operation.

67. An automobile speed change device including members operable to effect a plurality of speed changes, power means for operating said members, and adjustable means for modifying the effective force of said power during a part of its operative travel.

68. An automobile ratio change device including elements operable to effect a plurality of ratio changes, fluid power means for actuating said elements to effect said changes, and valve means applying said power for said changes and having graduated port construction for graduatedly applying said power and accordingly effecting said changes in a graduated manner.

69. In combination with a source of fluid power and automobile clutch controlling members, a ratio changing device including ratio change members actuated by said power for positive ratio engagement, a controller constructed and positioned for foot operation controlling the disengagement of the clutch and means for cooperatively combining said clutch and ratio change operations, causing the power application to occur after the clutch has been completely disengaged.

70. In a motor vehicle in combination with a source of fluid power and a single functionally unidirectional fluid power motor, a driving change device including ratio change members actuated by said single motor positively into three or more ratio engagements, and means tensionable by said motor for actuating said members into ratio disengagement.

71. In a motor vehicle, a driving ratio change device, fluid power means operating said device for a plurality of ratio changes, and clutch controlling means positioned and constructed for foot operation to determine ratio changes effected by said power means.

72. In a motor vehicle, in combination with a clutch pedal, a fluid power actuable device for controlling a normal function in said vehicle, a purely physical pressure selection means, and selector means associated with said clutch pedal, positioned and constructed for foot operation to determine the operation of said device.

73. In a motor vehicle having a clutch, a mechanism for the dual function of establishing and disestablishing a plurality of driving relations, fluid power means operating said mechanism for one of said functions, other means of operating said mechanism for the other of said functions, a plurality of driver pressable control elements for a plurality of said driving relations, and means associating said elements with said power means and mechanism combination whereby a unidirectional pressure by the driver on a selected element self-sufficiently controls for a complete cycle of selected change from one driving relation to another.

74. In a motor vehicle, the combination of a device diversely operable for diverse effects, fluid power means operating said device, purely physical pressure setting means determining subsequent operations of said device, and of a single driver operated controller positioned and constructed for foot operation controlling a normal function of automobile operation also controlling said setting means and said device for a complete change from one of said operative effects to another.

75. In an automobile, a driving ratio change mechanism, fluid power means for operating said mechanism, a single driver operated clutch controller, means associated with said controller for determining a subsequent driving ratio, power application effecting means operable by and only during a part of the movement of said controller, the unidirectional reciprocal operation of said controller self-sufficiently controlling the clutch and complete driving ratio changes, and means constructed to permit only one effective ratio determination at one time.

76. A mechanism for automobile operation including a plurality of elements reciprocally movable for a plurality of effects, direct power means adapted to move said elements in one direction, means other than said power means to move said elements in the other direction, a control pedal for a normal function of automobile control, purely physical pressure means determining the operation of said mechanism, means controllable by said pedal effecting said operation, and means whereby the operation of said pedal self sufficiently sets said determining means.

77. In an automobile, fluid pressure means actuable for a plurality of driving ratio changes, controlling means for the same constructed and positioned for foot operation diversely to determine any of said changes, and additional control means for an additional ratio change, operable in other manner than said foot operation.

78. In a motor vehicle a multiple driving relation change device having forward and reverse ratios, fluid power energized means actuating a plurality of changes in said device, means effectively applying said power actuation, change determining means constructed and arranged for different foot control to determine different changes, said determination being transmitted to said device, power and applying means combination through solely physical pressure communication connections, and further control means differently operable by the driver for controlling at least the change to the reverse driving ratio.

79. In a motor vehicle, a multiple driving relation change device for a plurality of forward, neutral and reverse relations, fluid power energized means actuating a plurality of changes in said device, immediate means applying said power actuation, control means positioned and constructed for foot operation determining a subsequent change and through mechanical connections with said applying means causing said power to effect said change, means preventing more than one change determination becoming effective at a time, and additional control means differently operable by the driver for controlling at least the change to the reverse driving relation.

80. A pedal driving ratio change device for forward and reverse speeds, fluid power means to effect a plurality of ratio changes in said device, ratio determining means for said power actuated changes, associated with said device and power means combination and completely settable by the foot operation of said pedal, and differently operable driver actuated remote control means for controlling reverse speed.

81. In an automobile, a driving ratio change mechanism having a plurality of driving ratio positions, purely physical pressure power means to effect ratio changes in said mechanism, a clutch pedal, ratio selection means associated with said pedal and constructed and positioned for foot operation to determine particular ratio selections, and means preventing a change of selection when the pedal is in ratio change effecting position.

82. In an automobile, a driving ratio change device, purely physical pressure power means operating said device, a single foot operable controller, means associated with said controller for determining a desired ratio, means to control a complete change cycle from one ratio to another solely by movement of said single controller, and means to effect neutral position by partial throw of said controller.

83. In a motor vehicle, the combination of a power operated ratio change mechanism, of foot-operable change determining means, of a remote visual ratio indicator automatically operable by said means and mechanism combination and of connections between said indicator and mechanism whereby the ratios of low intermediate and high speeds are indicated in their natural consecutive order of juxtaposition.

84. In a motor vehicle, a multiple driving relation change device for positive ratios and neutral driving relations, fluid power energized means effecting a plurality of changes in said device, immediate means applying said power actuation for said changes, and control means positioned and constructed for selective foot control determining a subsequent change and through solely physical pressure communication with said applying means causing said power to effect said change.

85. In a motor vehicle having the combination of a multiple driving relation change mechanism for positive ratios and neutral driving relations, of power energized means to effect a plurality of changes in said mechanism and of immediate means to apply said power actuation, a combined change determining and change effecting control means constructed and positioned for different foot control to effect different changes, and solely physical pressure connections communicating such determined effecting control with said mechanism, power and applying means combination.

86. In a motor vehicle having in combination a variable driving relation change mechanism for positive ratios and neutral driving relations, fluid power energized means to effect a relation change in said mechanism and means effectively applying said power, change determining means positioned and constructed for foot control and having a plurality of functionally distinct optionally operable foot pressable areas for subsequent change determination, said determination being transmitted to said power means, mechanism and applying means combination solely through physical pressure communication connections.

87. In a motor vehicle, a clutch, a driving relation change mechanism, fluid power energized means operating said mechanism for a plurality of changes, change effecting control means constructed and positioned for foot operation having a plurality of functionally distinct foot pressable areas for a plurality of changes, means associating said control means with said power means and mechanism combination whereby the pressure of the foot on a selected area self-sufficiently controls said combination for a complete selected change from one driving relation to another, and means preventing more than one change determination becoming effective at a time.

88. In an automobile, a clutch, a multiple driving relation change device, power energized means effecting a change in said device, a purely mechanical subsequent change determining mechanism mechanically associated with said device and power means combination, and a single controller constructed and positioned for foot operation and self-sufficiently controlling said device power means and mechanism combination for a complete desired change from one relation to another.

89. In a motor vehicle, a driving ratio change mechanism having at least a duality of reciprocally movable driving relation elements for a plurality of driving ratio connections and disconnections, power means moving said duality of elements through the agency of common means giving a single path of such power communication and interchangeably connectible to either of said elements, and driver-operated change effecting control means for a plurality of changes positioned and constructed for different foot control to effect a different relation change in said mechanism.

90. A ratio change mechanism located substantially beneath the driving compartment flooring of an automobile, fluid power actuated means effecting a driving relation change in said mechanism, foot operable change determining means, an additional remote driver-energized actuator mounted normally accessible to the driver to actuate a relation change, and further mechanical actuation communicating means connecting said remote actuator with said mechanism.

91. In a motor vehicle having a multiple driving relation change mechanism for positive ratios and neutral relations purely physical pressure power means effecting a change in driving ratios in said mechanism through solely physical pressure energy communicating means, an additional driver-energized actuator normally associated with said mechanism and accessible to the driver to effect relation changes in said mechanism, and means necessitating distinctly special control operation by the driver for effecting the reverse driving relation.

BERNARD H. MOSSINGHOFF.